(12) United States Patent
Tylik et al.

(10) Patent No.: US 11,301,156 B2
(45) Date of Patent: Apr. 12, 2022

(54) VIRTUAL DISK CONTAINER AND NVME STORAGE MANAGEMENT SYSTEM AND METHOD

(71) Applicant: EMC IP Holding Company, LLC, Hopkinton, MA (US)

(72) Inventors: Dmitry Tylik, Westborough, MA (US); Mukesh Gupta, Shrewsbury, MA (US); David L. Black, Acton, MA (US)

(73) Assignee: EMC IP HOLDING COMPANY, LLC, Hopkinton, MA (US)

( * ) Notice: Subject to any disclaimer, the term of this patent is extended or adjusted under 35 U.S.C. 154(b) by 227 days.

(21) Appl. No.: 16/672,088

(22) Filed: Nov. 1, 2019

(65) Prior Publication Data

US 2021/0132840 A1    May 6, 2021

(51) Int. Cl.
*G06F 3/06* (2006.01)
*G06F 9/455* (2018.01)

(52) U.S. Cl.
CPC .......... *G06F 3/0644* (2013.01); *G06F 3/0604* (2013.01); *G06F 3/0659* (2013.01); *G06F 3/0679* (2013.01); *G06F 9/45558* (2013.01); *G06F 2009/45583* (2013.01)

(58) Field of Classification Search
CPC .... G06F 3/0604; G06F 3/0644; G06F 3/0659; G06F 3/0679; G06F 9/45558; G06F 2009/45583
USPC ........................................................ 711/103
See application file for complete search history.

(56) References Cited

U.S. PATENT DOCUMENTS

| 10,764,180 | B1 * | 9/2020 | Klein | H04L 49/25 |
|---|---|---|---|---|
| 10,880,205 | B1 * | 12/2020 | Puttagunta | H04L 41/0853 |
| 2018/0188985 | A1 * | 7/2018 | Wysocki | G06F 12/0866 |
| 2018/0260158 | A1 * | 9/2018 | Marripudi | G06F 3/0605 |

OTHER PUBLICATIONS

NVM Express, "NVM Express Revision 1.4", Jun. 10, 2019, pp. 1-5, 88, 137-138, 161-171, 201-205, 369-378 , available at <https://nvmexpress.org/wp-content/uploads/NVM-Express-1_4-2019.06.10-Ratified.pdf> (Year: 2019).*

NVM Express, "NVM Express over Fabrics Revision 1.0a", Jul. 17, 2018, pp. 1-13, 34-41, available at <https://nvmexpress.org/wp-content/uploads/NVMe-over-Fabrics-1_0a-2018.07.23-Ratified.pdf> (Year: 2018).*

NVM Express, "NVM Express Management Interface Revision 1.0", Nov. 17, 2015, pp. 1-13, 63-68, available at <https://nvmexpress.org/wp-content/uploads/NVM_Express_Management_Interface_1_0_gold.pdf> (Year: 2015).*

(Continued)

*Primary Examiner* — Reginald G Bragdon
*Assistant Examiner* — Aaron D Ho
(74) *Attorney, Agent, or Firm* — Brian J. Colandreo; Mark H. Whittenberger; Holland & Knight LLP

(57) ABSTRACT

A method, computer program product, and computing system for defining a vVol NVMe subsystem for a plurality of vVol NVMe namespaces within a storage system; and enabling an Asymmetric Namespace Access (ANA) group that aggregates two or more vVol NVMe namespaces defined within the plurality of vVol NVMe namespaces and communicates ANA group information in-band, thus eliminating the need for out-of-band communication of vVol protocol endpoint information.

21 Claims, 3 Drawing Sheets

(56) References Cited

OTHER PUBLICATIONS

Reich, Itzik, "What is Dell EMC Powerstore—Part 4, vVols", posted May 6, 2020, hosted on Itikr's Blog at <https://volumes.blog/2020/05/06/what-is-powerstore-part-4-vvols/> (Year: 2020).*
Tonnesen, Drew, "VMware past, present, and future with Dell EMC PowerMax", May 3, 2019, hosted at <https://drewtonnesen.files.wordpress.com/2019/05/dtw_2019_vmware.pdf> (Year: 2019).*
Unknown, "IBM FlashSystem V9000", 2018, IBM Corporation (Year: 2018).*

\* cited by examiner

VIRTUAL DISK CONTAINER AND NVME STORAGE MANAGEMENT SYSTEM AND METHOD

TECHNICAL FIELD

This disclosure relates to storage management processes and, more particularly, to storage management processes for use in high-availability storage systems.

BACKGROUND

Storing and safeguarding electronic content is of paramount importance in modern business. Accordingly, various methodologies may be employed to protect and distribute such electronic content, wherein the storage systems that process such content may strive to do so in as an efficient manner as possible. Unfortunately and due to the complexity of such storage systems, tasks that were once simple have become more complex.

SUMMARY OF DISCLOSURE

In one implementation, a computer-implemented method is executed on a computing device and includes: defining a vVol NVMe subsystem for a plurality of vVol NVMe namespaces within a storage system; and enabling an Asymmetric Namespace Access (ANA) group that aggregates two or more vVol NVMe namespaces defined within the plurality of vVol NVMe namespaces and communicates ANA group information in-band, thus eliminating the need for out-of-band communication of vVol protocol endpoint information.

One or more of the following features may be included. A vVol discovery service configured to analyze the vVol NVMe subsystem and report specifics of the vVol NVMe subsystem to a host may be defined. A new vVol NVMe namespace may be generated out-of-band at time T1. Generating a new vVol NVMe namespace out-of-band at time T1 may include generating a new vVol NVMe namespace out-of-band at time T1 to enable the effectuation of one or more data services. The new vVol NVMe namespace may be bound at time T2 to allow in-band reporting via a controller. Binding the new vVol NVMe namespace at time T2 to allow in-band reporting via a controller may include binding the new vVol NVMe namespace at time T2 to allow in-band reporting via a controller to enable access to an output of one or more data services. The two or more vVol NVMe namespaces aggregated within the Asymmetric Namespace Access (ANA) group may have a common path and may be trackable at an ANA group level by a hypervisor.

In another implementation, a computer program product resides on a computer readable medium and has a plurality of instructions stored on it. When executed by a processor, the instructions cause the processor to perform operations including: defining a vVol NVMe subsystem for a plurality of vVol NVMe namespaces within a storage system; and enabling an Asymmetric Namespace Access (ANA) group that aggregates two or more vVol NVMe namespaces defined within the plurality of vVol NVMe namespaces and communicates ANA group information in-band, thus eliminating the need for out-of-band communication of vVol protocol endpoint information.

One or more of the following features may be included. A vVol discovery service configured to analyze the vVol NVMe subsystem and report specifics of the vVol NVMe subsystem to a host may be defined. A new vVol NVMe namespace may be generated out-of-band at time T1. Generating a new vVol NVMe namespace out-of-band at time T1 may include generating a new vVol NVMe namespace out-of-band at time T1 to enable the effectuation of one or more data services. The new vVol NVMe namespace may be bound at time T2 to allow in-band reporting via the controller. Binding the new vVol NVMe namespace at time T2 to allow in-band reporting via the controller may include binding the new vVol NVMe namespace at time T2 to allow in-band reporting via a controller to enable access to an output of one or more data services. The two or more vVol NVMe namespaces aggregated within the Asymmetric Namespace Access (ANA) group may have a common path and may be trackable at an ANA group level by a hypervisor.

In another implementation, a computing system includes a processor and memory is configured to perform operations including: defining a vVol NVMe subsystem for a plurality of vVol NVMe namespaces within a storage system; and enabling an Asymmetric Namespace Access (ANA) group that aggregates two or more vVol NVMe namespaces defined within the plurality of vVol NVMe namespaces and communicates ANA group information in-band, thus eliminating the need for out-of-band communication of vVol protocol endpoint information.

One or more of the following features may be included. A vVol discovery service configured to analyze the vVol NVMe subsystem and report specifics of the vVol NVMe subsystem to a host may be defined. A new vVol NVMe namespace may be generated out-of-band at time T1. Generating a new vVol NVMe namespace out-of-band at time T1 may include generating a new vVol NVMe namespace out-of-band at time T1 to enable the effectuation of one or more data services. The new vVol NVMe namespace may be bound at time T2 to allow in-band reporting via the controller. Binding the new vVol NVMe namespace at time T2 to allow in-band reporting via the controller may include binding the new vVol NVMe namespace at time T2 to allow in-band reporting via a controller to enable access to an output of one or more data services. The two or more vVol NVMe namespaces aggregated within the Asymmetric Namespace Access (ANA) group may have a common path and may be trackable at an ANA group level by a hypervisor.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
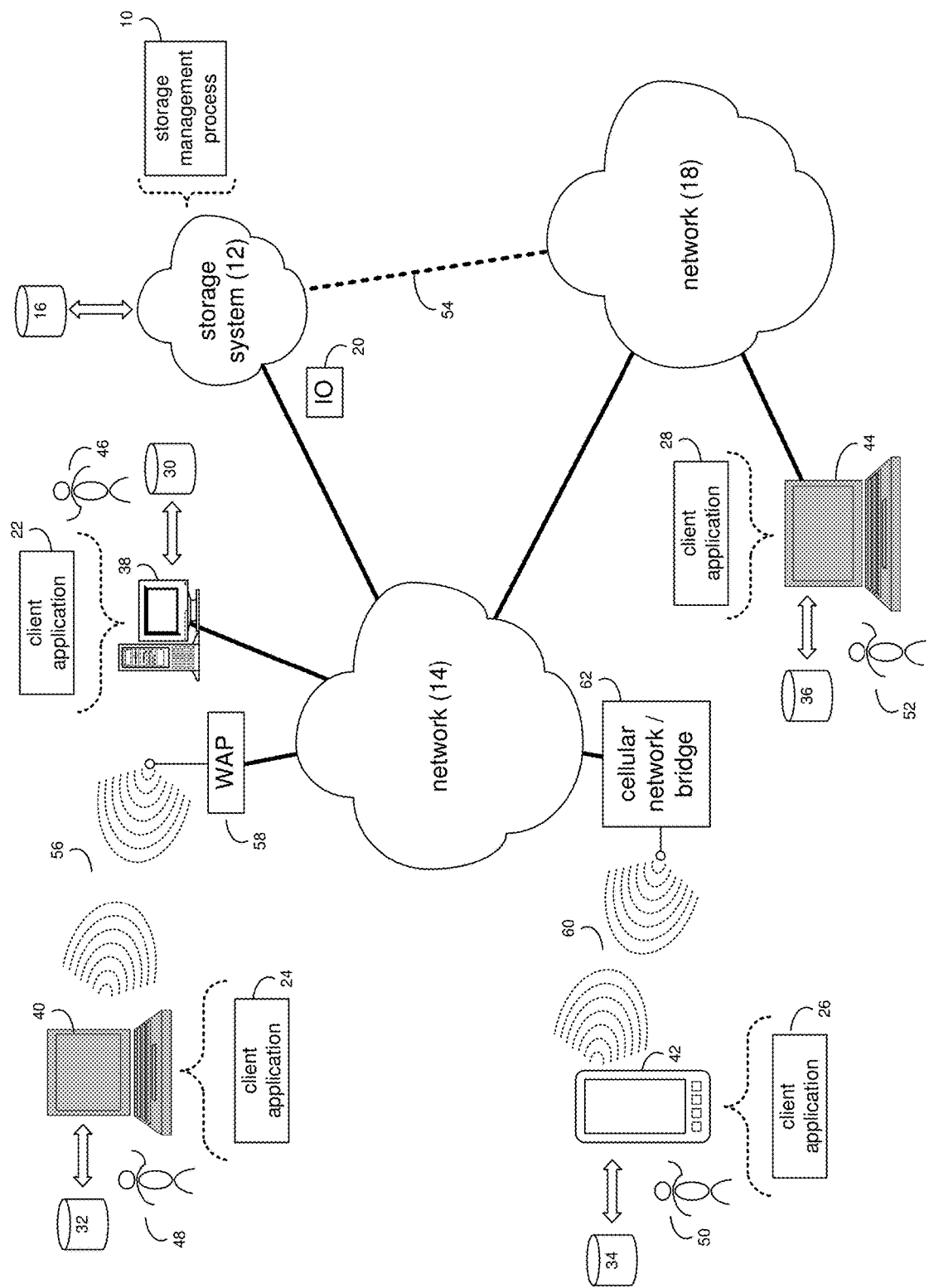
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a personal computer with a memory system, a server computer with a memory system, a Network Attached Storage (NAS) system, a Storage Area Network (SAN) and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™; Redhat Linux™, Unix, or a custom operating system, for example.

The instruction sets and subroutines of storage management process 10, which may be stored on storage device 16 coupled to storage system 12, may be executed by one or more processors (not shown) and one or more memory architectures (not shown) included within storage system 12. Storage device 16 may include but is not limited to: a hard disk drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices (e.g., client electronic devices 38, 40, 42, 44) may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple OS X™, Redhat Linux™, or a custom operating system.

Figure 2:
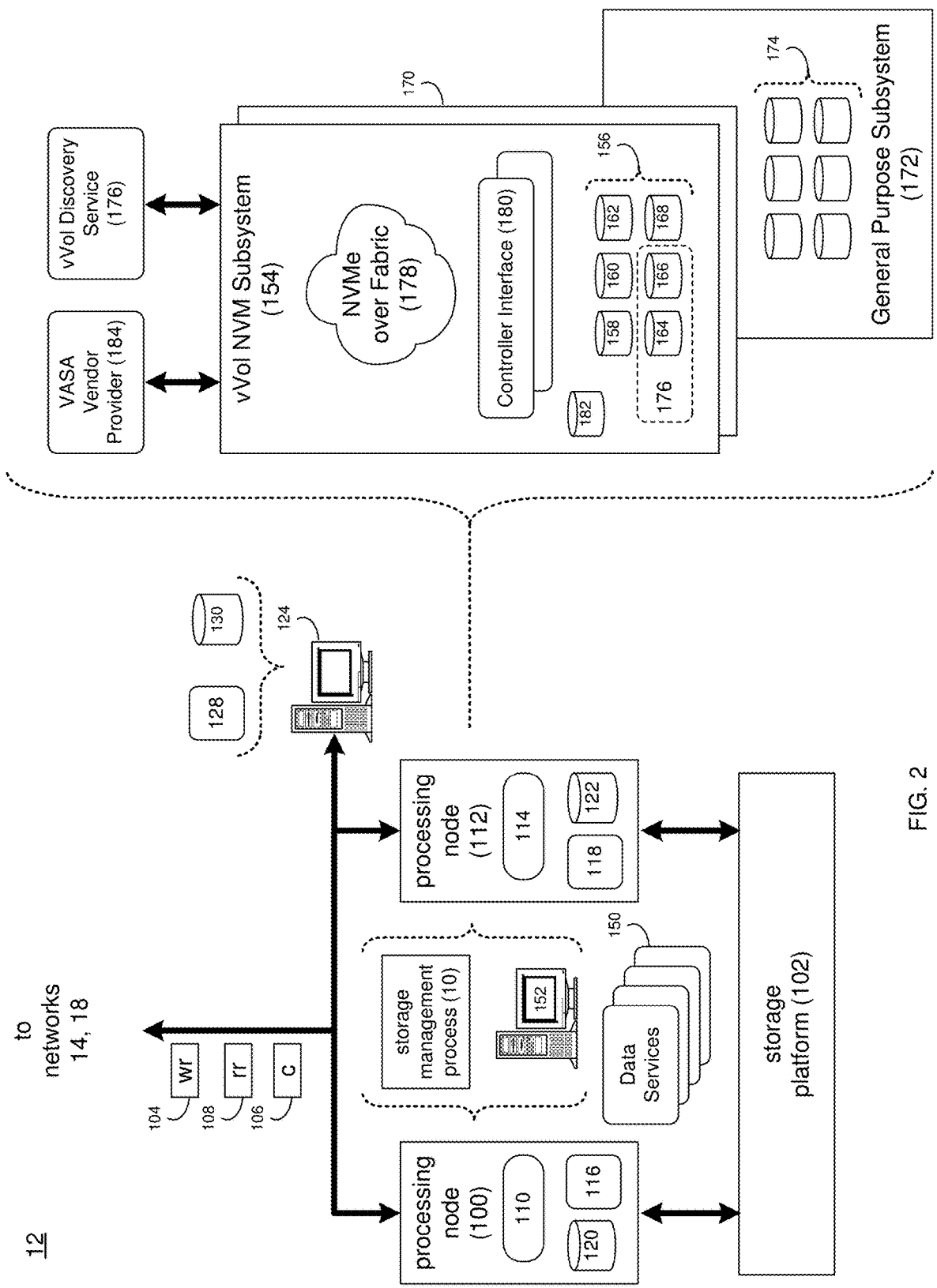
FIG. 2 is a diagrammatic view of the storage system of FIG. 1.

The Data Storage System:

Referring also to FIG. 2, there is shown a general implementation of storage system 12. In this general implementation, storage system 12 may include processing node 100. Processing node 100 may be configured to perform computational tasks and may be configured to store data within storage platform 102.

Depending upon the manner in which storage system 12 is configured, storage platform 102 may include a single storage device (such as a single hard disk drive or a single solid state storage device) or may include a plurality of storage devices that are configured to provide various levels of performance and/or high availability. For example and if storage platform 102 includes a plurality of storage devices (e.g., hard disk drives and/or solid state storage devices), this plurality of storage devices may be configured to form a RAID storage array utilizing various standard RAID structures (e.g., RAID 0, RAID 1, RAID 3, RAID 5, RAID 6, RAID 7 or RAID 10), thus providing a higher level of performance and/or availability.

Storage system 12 may be configured to execute all or a portion of storage management process 10. The instruction sets and subroutines of storage management process 10, which may be stored on a storage device (e.g., storage device 16) coupled to e.g., processing node 100, may be executed by one or more processors (not shown) and one or more memory architectures (not shown) included within processing node 100.

As discussed above, various IO requests (e.g. IO request 20) may be generated. For example, these IO requests may be sent from client applications 22, 24, 26, 28 to storage system 12. Additionally/alternatively and when storage system 12 is configured as an application server, these IO requests may be internally generated within storage system 12. Examples of IO request 20 may include but are not limited to data write request 104 (i.e. a request that content 106 be written to storage system 12) and data read request 108 (i.e. a request that content 106 be read from storage system 12).

During operation of processing node 100, content 106 to be written to storage system 12 may be processed by processing node 100. Additionally/alternatively and when storage system 12 is configured as an application server, content 106 to be written to storage system 12 may be internally generated by processing node 100.

Processing node 100 may include cache memory system 110. Examples of cache memory system 110 may include but are not limited to a volatile, solid-state, cache memory system (e.g., a static RAM cache memory system) and/or a non-volatile, solid-state, cache memory system (e.g., a flash-based, cache memory system). Processing node 100 may initially store content 106 within cache memory system 110. Depending upon the manner in which cache memory system 110 is configured, processing node 100 may immediately write content 106 to storage platform 102 (if cache memory system 110 is configured as a write-through cache) or may subsequently write content 106 to storage platform 102 (if cache memory system 110 is configured as a write-back cache).

Storage system 12 may be configured to include a plurality of processing nodes, each of which may be configured to receive, generate and/or process content (e.g., content 106). For example and in addition to processing node 100, storage system 12 may include one or more additional processing nodes (e.g., processing node 112). Processing node 112 may be configured to perform computational tasks and may be configured to store data within storage platform 102.

Processing node 112 may include cache memory system 114. Examples of cache memory system 114 may include but are not limited to a volatile, solid-state, cache memory system (e.g., a static RAM cache memory system) and/or a non-volatile, solid-state, cache memory system (e.g., a flash-based, cache memory system). Processing node 112 may initially store content 106 within cache memory system 114. Depending upon the manner in which cache memory system 114 is configured, processing node 112 may immediately write content 106 to storage platform 102 (if cache memory system 114 is configured as a write-through cache) or may subsequently write content 106 to storage platform 102 (if cache memory system 114 is configured as a write-back cache).

One or more of processing nodes 100, 112 may be configured to execute one of more virtual machines. For example, virtual machine 116 may be executed on processing node 100 and/or virtual machine 118 may be executed on processing node 112). Additionally, one or more server computers (e.g., server computer 124) may be coupled to (or accessible by) storage system 12, wherein server computer 124 may be configured to execute one of more virtual machines (e.g., virtual machine 128).

As is known in the art, a virtual machine (VM) may be an emulation of a computer system. Virtual machines may be based on computer architectures and may provide the functionality of a physical computer. The implementation of these virtual machines may involve specialized hardware, software, or a combination of both.

There are different kinds of virtual machines, each with different functionality:
  System Virtual Machines (also termed full virtualization VMs) may provide a substitute for a real machine and may provide functionality for executing entire operating systems. A hypervisor may use native execution to share and manage hardware, thus allowing for multiple environments that are isolated from one another but exist on the same physical machine. Modern hypervisors may use hardware-assisted virtualization (i.e., virtualization-specific hardware) primarily sourced from the host CPUs.
  Process Virtual Machines may be designed to execute computer programs in a platform-independent environment.

One or more of virtual machines 116, 118 may be configured to utilize/maintain one or more virtual volumes (i.e., vVols). For example, virtual machine 116 may utilize/maintain vVol 120, virtual machine 118 may utilize/maintain vVol 122 and/or virtual machine 128 may utilize/maintain vVol 130.

As is known in the art, virtual volumes may enable an administrator of a storage system to apply a policy to a virtual machine that defines various criteria (e.g., capacity limits, RAID levels, replication criteria, deduplication criteria, etc.), wherein the virtual machine and the virtual volume may be placed onto a storage system (e.g. storage system 12) that adheres to such criteria and may be utilized to store data concerning e.g., a virtual machine.

Storage Management Process:

Storage system 12 may be configured to offer/provide various data services (e.g., data services 150), examples of which may include but are not limited to higher priority access services, lower priority access services, snapshot services, backup services, deduplication services, high-availability/redundancy services, and compression services. As is known in the art, these data services (e.g., data services 150) are typically offered at a datastore level. Accordingly, all of the virtual machines (e.g., VMs 116, 118) and virtual volumes (e.g., vVol 120, vVol 122) made available within storage system 12 would need to be offered with the same set of data services. And unfortunately, different virtual machines and/or virtual volumes may require different data services.

For example, some virtual machines/volumes may need to be based upon faster underlying physical storage devices, while others may utilize slower underlying storage devices. Additionally, some virtual machines/volumes may require a higher level of availability/redundancy, while others may utilize a lower level of availability/redundancy. Still, some virtual machines/volumes may require that snapshots be performed more frequently, while others may perform snapshots less frequently.

To overcome this limitation, storage systems often created a unique virtual space for each virtual machine, thus allowing each virtual machine to receive a bespoke set of data services. Unfortunately, such a configuration created tremendous overhead (due to the large quantity of virtual spaces/paths being monitored by the hypervisor (e.g., hypervisor 152) within the storage system (e.g., storage system 12), thus resulting in a reduced level of performance/reliability for these storage systems.

As is known in the art, a hypervisor (e.g., hypervisor 152) is computer software, firmware or hardware that creates and runs virtual machines (e.g., VMs 116, 118). A computer on which a hypervisor (e.g., hypervisor 152) runs one or more virtual machines (e.g., VMs 116, 118) may be called a host machine, and each virtual machines (e.g., VMs 116, 118) may be called a guest machine. The hypervisor (e.g., hypervisor 152) may present the guest operating systems with a virtual operating platform and may manage the execution of the guest operating systems. Multiple instances of a variety of operating systems may share the virtualized hardware resources. For example, Linux, Windows, and macOS instances may all be run on a single physical x86 architecture machine.

In order to overcome the above-described issue of overloading the hypervisor (e.g., hypervisor 152), the monitored paths were aggregated into conglomerate logical units, wherein a conglomerate logical unit is a group of individual monitored paths that are grouped together so that the hypervisor (e.g., hypervisor 152) may monitor this group of paths as a single entity (as opposed to having to monitor these paths individually and overloading e.g., hypervisor 152). In such a configuration, communications concerning data were handled in-band via SCSI connections and communications concerning the management of the storage system were handled out-of-band via VASA connections.

As is known in the art, SCSI (i.e., Small Computer System Interface) is a set of parallel interface standards developed by the American National Standards Institute (ANSI) for attaching printers, disk drives, scanners and other peripherals to computers. As SCSI was initially released in 1986, SCSI is an aging and less-efficient technology. As is known in the art, VASA (i.e., vStorage APIs for Storage Awareness) is a set of application program interfaces (APIs) that enables vSphere vCenter to recognize the capabilities of storage arrays.

As is known in the art, NVMe (i.e., Non-Volatile Memory express) is a host controller interface and storage protocol that was released in 2013 to accelerate the transfer of data between enterprise and client systems and solid-state drives (SSDs) over a computer's high-speed Peripheral Component Interconnect Express (PCIe) bus. NVMe provides an alternative to the Small Computer System Interface (SCSI) standard and the Advanced Technology Attachment (ATA) standard for connecting and transmitting data between a host system and a peripheral target storage device. Specifically, the ATA command set in use with Serial ATA (SATA) SSDs and the SCSI command set for Serial Attached SCSI (SAS) SSDs were developed at a time when hard disk drives (HDDs) and tape were the primary storage media. NVMe was designed for use with faster solid state media.

As is known in the art, NVMe-oF (i.e., Non-Volatile Memory express over Fabric) is a technology specification designed to enable non-volatile memory express (NVMe) message-based commands to transfer data between a host computer and a target solid-state storage device or system over a network (e.g., an Ethernet, Fibre Channel (FC) and/or InfiniBand network), as opposed to being limited to a Peripheral Component Interconnect Express (PCIe) bus.

Figure 3:
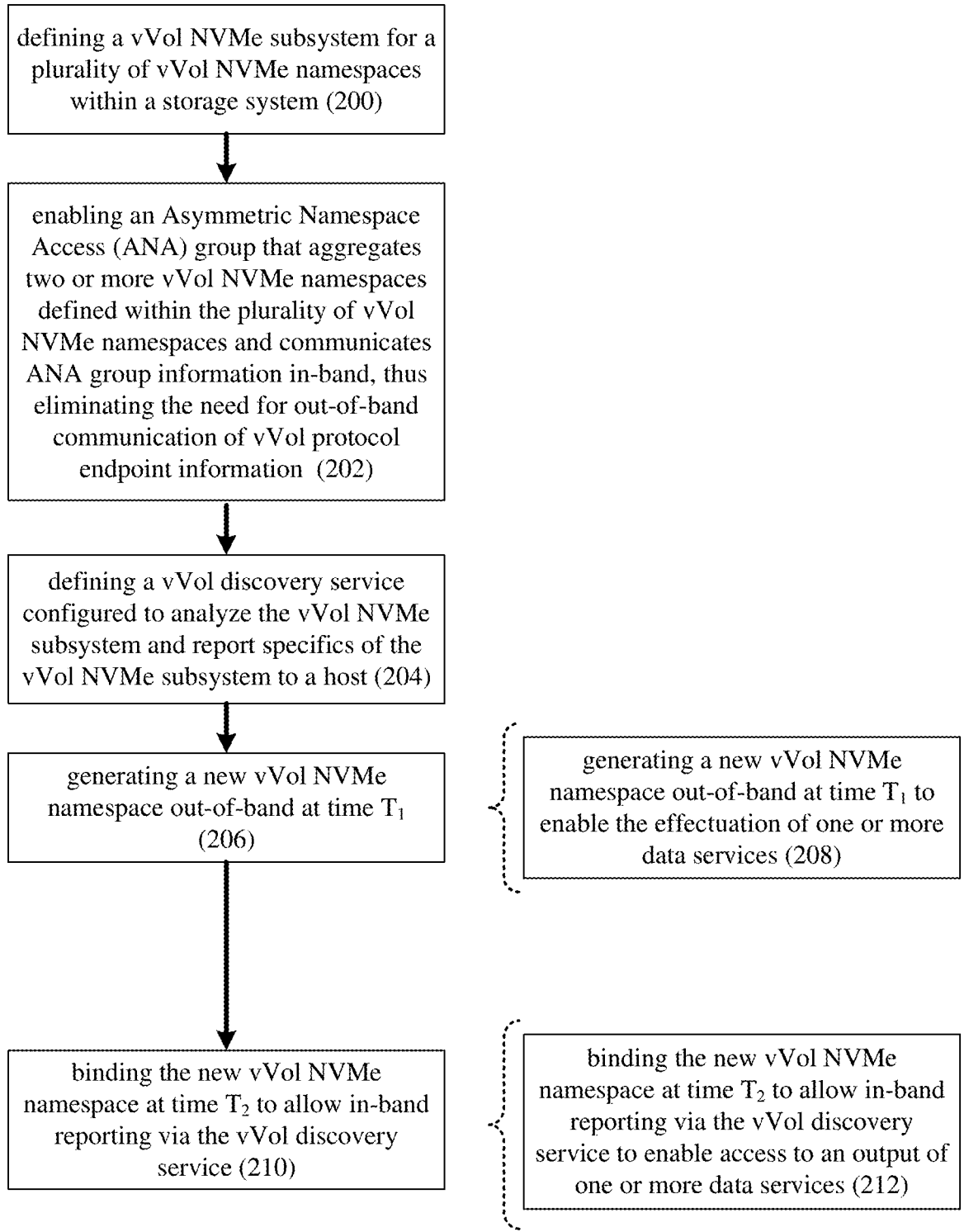
FIG. 3 is a flow chart of the storage management process of FIG. 1.

Referring also to FIG. 3, storage management process 10 may define 200 a vVol NVMe subsystem (e.g., vVol NVMe subsystem 154) for plurality of vVol NVMe namespaces 156 (e.g., a plurality of vVols) within a storage system (e.g., storage system 12). While plurality of vVol NVMe namespaces 156 is shown to include six namespaces (e.g., namespaces 158, 160, 162, 164, 166, 168), this is for illustrative purposes only and is not intended to be a limitation of this disclosure, as other configurations are possible and are considered to be within the scope of this disclosure. For example, the quantity of vVol NVMe namespaces included within plurality of vVol NVMe namespaces 156 may be increased or decreased depending upon design criteria and specific need.

Additionally, storage management process 10 may define one or more additional vVol NVMe subsystems (e.g., vVol NVMe subsystem 170) for additional vVol NVMe namespaces (not shown) within storage system 12, thus allowing for further compartmentalization of storage system 12 (if desired). Further, storage management process 10 may define one or more general purpose subsystems (e.g., general purpose subsystem 172) for a plurality of general purpose namespaces (e.g., plurality of general purpose namespaces 174) within storage system 12, thus allowing for expanded functionality of storage system 12 (if desired).

Storage management process 10 may enable 202 an Asymmetric Namespace Access (ANA) group (e.g., ANA group 176) that may aggregate two or more vVol NVMe namespaces (e.g., vVol NVMe namespaces 164, 166) defined within the plurality of vVol NVMe namespaces (e.g., plurality of vVol NVMe namespaces 156) and may communicate ANA group information in-band. Specifically and through the use of ANA group 176 that communicates ANA group information in-band, the need for protocol endpoints and communication of vVol protocol endpoint information out-of-band are eliminated. Naturally, the number of vVol NVMe namespaces included within an Asymmetric Namespace Access (ANA) group may be increased or decreased depending upon the capabilities of storage system 12 and the needs of the host (e.g., one of user 46, 48, 50, 52).

The two or more vVol NVMe namespaces (e.g., vVol NVMe namespaces 164, 166) aggregated within the Asymmetric Namespace Access (ANA) group (e.g., ANA group 176) may have a common path (e.g., that locates the virtual volume/virtual disk associated with each namespace) and may be trackable at an ANA group level by hypervisor 152 within storage system 12. Accordingly and through the use of such ANA groups, the quantity of paths monitored by (in this example) hypervisor 152 may be reduced, thus reducing the loading and overhead of hypervisor 152.

Storage management process 10 may define 204 a vVol discovery service (e.g., vVol discovery service 176) configured to analyze the vVol NVMe subsystem (e.g., vVol NVMe subsystem 154) and report specifics of the vVol NVMe subsystem (e.g., vVol NVMe subsystem 154) to a host (e.g., hypervisor 152). The vVol discovery service (e.g., vVol discovery service 176) may be configured to be easily accessible by the host (e.g., hypervisor 152), wherein the host (e.g., hypervisor 152) may connect to vVol discovery service 176 to obtain information concerning (in this example) namespaces 158, 160, 162, 164, 166, 168 so that the host (e.g., hypervisor 152) may access namespaces 158, 160, 162, 164, 166, 168 and obtain the data contained therein.

vVol discovery service 176 and vVol NVM Subsystem 154 may be configured to communicate via NVMe over Fabric 178, wherein vVol NVM Subsystem 154 may include one or more controllers (e.g., controllers 180) that allow for communication via NVMe over Fabric 178.

Whenever new namespaces are needed within storage system 12, storage management process 10 may generate 206 these new namespaces (e.g., vVol NVMe namespace 182) out-of-band. When generating 206 these new namespaces (e.g., vVol NVMe namespace 312) out-of-band, storage management process 10 may generate 208 the new namespaces (e.g., vVol NVMe namespace 156) out-of-band to enable the effectuation of one or more data services (e.g., data services 150).

For example, assume that a new vVol (e.g., vVol NVMe namespace 182) needs to be generated so that e.g., snapshots of an existing namespace (e.g., namespace 168) may be generated and stored over the course of the next year so that these snapshots may later be analyzed. As discussed above, communications concerning the management of storage system 12 may be handled out-of-band via VASA connectivity. Therefore, storage system 12 may include VASA vendor provider 184 to effectuate such out-of-band communications and further reduce loading of hypervisor 152.

Continuing with the above-stated example, assume that storage management process 10 generates 206 vVol NVMe namespace 182 out-of-band at time $T_1$ (i.e., Day 0). Further and once generated 206, vVol NVMe namespace 182 may store one or more snapshots of namespace 168 during the course of the next year (until $T_2$, namely Day 365). Accordingly, vVol NVMe namespace 182 may not need to be accessed or accessible for an entire year.

Once access is needed, storage management process 10 may bind 210 the new vVol NVMe namespace (e.g., vVol NVMe namespace 182) at time T2 (e.g., Day 365) to allow in-band reporting via controller 180. Specifically and by binding 210 vVol NVMe namespace 182 at time T2 (e.g., Day 365), vVol NVMe namespace 182 will be discoverable via vVol discovery service 176 from time T2 (e.g., Day 365) forward. Further and by delaying the binding 210 of vVol NVMe namespace 182 until time T2 (e.g., Day 365), the loading of hypervisor 152 may be reduced between time T1 and time T2 (i.e., an entire year in this example), as hypervisor 152 does not need to monitor the path associated with vVol NVMe namespace 182 during this time period. For example and concerning the manner in which binding 210 vVol NVMe namespace 182 at time T2 allows in-band reporting via controller 180, vVol discovery service 176 may provide a list of NVMe fabric ports to which hosts may connect. By defining this list of NVMe fabric ports, a specific host may select one of these NVMe fabric ports and storage management process 10 may generate controller 180 for the connecting host, thus enabling the host to retrieve a list of vVol NVMe namespaces configured for the host.

When binding 210 the new vVol NVMe namespace (e.g., vVol NVMe namespace 182) at time $T_2$ to allow in-band reporting via controller 180, storage management process 10 may bind 212 the new vVol NVMe namespace (e.g., vVol NVMe namespace 182) at time $T_2$ to allow in-band reporting via controller 180 to enable access to an output of one or more data services (e.g., data services 150), such as e.g., the weekly snapshot of namespace 168, a backup file of namespace 168, a report concerning a deduplication operation on namespace 168, or a report concerning a compression operation of namespace 168.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
    defining a virtual disk container non-volatile memory express (NVMe) subsystem for a plurality of virtual disk container non-volatile memory express (NVMe) namespaces within a storage system;
    enabling an Asymmetric Namespace Access (ANA) group that aggregates two or more virtual disk container NVMe namespaces defined within the plurality of virtual disk container NVMe namespaces and communicates ANA group information in-band; and
    managing the storage system out-of-band via API connectivity, wherein the ANA group information is configured to replace virtual disk container protocol endpoint information of the API connectivity.

2. The computer-implemented method of claim 1 further comprising:
    defining a virtual disk container discovery service configured to analyze the virtual disk container NVMe subsystem and report specifics of the virtual disk container NVMe subsystem to a host.

3. The computer-implemented method of claim 2 further comprising:
    generating a new virtual disk container non-volatile memory express (NVMe) namespace out-of-band at time $T_1$.

4. The computer-implemented method of claim 3 wherein generating the new virtual disk container NVMe namespace out-of-band at time $T_1$ includes:
    enabling effectuation of one or more data services.

5. The computer-implemented method of claim 3 further comprising:
    binding the new virtual disk container NVMe namespace at time $T_2$, wherein binding the new virtual disk container NVMe namespace at time $T_2$ includes allowing in-band reporting via a controller.

6. The computer-implemented method of claim 5 wherein binding the new virtual disk container NVMe namespace at time $T_2$ to allow in-band reporting via the controller includes:
    enabling access to an output of one or more data services.

7. The computer-implemented method of claim 1 wherein the two or more virtual disk container NVMe namespaces aggregated within the Asymmetric Namespace Access (ANA) group have a common path and are trackable at an ANA group level by a hypervisor.

8. A computer program product residing on a non-transitory computer readable medium having a plurality of instructions stored thereon which, when executed by a processor, cause the processor to perform operations comprising:
    defining a virtual disk container non-volatile memory express (NVMe) subsystem for a plurality of virtual disk container non-volatile memory express (NVMe) namespaces within a storage system;
    enabling an Asymmetric Namespace Access (ANA) group that aggregates two or more virtual disk container NVMe namespaces defined within the plurality of virtual disk container NVMe namespaces and communicates ANA group information in-band; and
    managing the storage system out-of-band via API connectivity, wherein the ANA group information is configured to replace virtual disk container protocol endpoint information of the API connectivity.

9. The computer program product of claim 8 further comprising:
    defining a virtual disk container discovery service configured to analyze the virtual disk container NVMe subsystem and report specifics of the virtual disk container NVMe subsystem to a host.

10. The computer program product of claim 9 further comprising:
    generating a new virtual disk container non-volatile memory express (NVMe) namespace out-of-band at time $T_1$.

11. The computer program product of claim 10 wherein generating the new virtual disk container NVMe namespace out-of-band at time $T_1$ includes:
    enabling effectuation of one or more data services.

12. The computer program product of claim 10 further comprising:
    binding the new virtual disk container NVMe namespace at time $T_2$, wherein binding the new virtual disk container NVMe namespace at time $T_2$ includes allowing in-band reporting via a controller.

13. The computer program product of claim 12 wherein binding the new virtual disk container NVMe namespace at time $T_2$ to allow in-band reporting via the controller includes:
    enabling access to an output of one or more data services.

14. The computer program product of claim 8 wherein the two or more virtual disk container NVMe namespaces aggregated within the Asymmetric Namespace Access (ANA) group have a common path and are trackable at an ANA group level by a hypervisor.

15. A computing system including a processor and memory, wherein the processor is configured to perform operations comprising:
defining a virtual disk container non-volatile memory express (NVMe) subsystem for a plurality of vVol non-volatile memory express (NVMe) namespaces within a storage system;
enabling an Asymmetric Namespace Access (ANA) group that aggregates two or more virtual disk container NVMe namespaces defined within the plurality of virtual disk container NVMe namespaces and communicates ANA group information in-band; and
managing the storage system out-of-band via API connectivity, wherein the ANA group information is configured to replace virtual disk container protocol endpoint information of the API connectivity.

16. The computing system of claim 15, wherein the processor is further configured to perform operations comprising:
defining a virtual disk container discovery service configured to analyze the virtual disk container NVMe subsystem and report specifics of the virtual disk container NVMe subsystem to a host.

17. The computing system of claim 16, wherein the processor is further configured to perform operations comprising:
generating a new virtual disk container non-volatile memory express (NVMe) namespace out-of-band at time $T_1$.

18. The computing system of claim 17 wherein generating the new virtual disk container NVMe namespace out-of-band at time $T_1$ includes:
enabling effectuation of one or more data services.

19. The computing system of claim 17, wherein the processor is further configured to perform operations comprising:
binding the new virtual disk container NVMe namespace at time $T_2$, wherein binding the new virtual disk container NVMe namespace at time $T_2$ includes allowing in-band reporting via a controller.

20. The computing system of claim 19 wherein binding the new virtual disk container NVMe namespace at time $T_2$ to allow in-band reporting via the controller includes:
enabling access to an output of one or more data services.

21. The computing system of claim 15 wherein the two or more virtual disk container NVMe namespaces aggregated within the Asymmetric Namespace Access (ANA) group have a common path and are trackable at an ANA group level by a hypervisor.

* * * * *